United States Patent [19]

Light

[11] Patent Number: 4,949,825

[45] Date of Patent: Aug. 21, 1990

[54] FLUID COUPLING DEVICE HAVING IMPROVED TEMPERATURE RESPONSIVENESS

[75] Inventor: Gerard M. Light, Marshall, Mich.

[73] Assignee: Eaton Corporation, Cleveland, Ohio

[21] Appl. No.: 361,478

[22] Filed: Jun. 5, 1990

[51] Int. Cl.$^5$ .............................................. F16D 35/02
[52] U.S. Cl. ................................ 192/58 B; 192/82 T; 192/113 A
[58] Field of Search ............... 192/58 B, 82 T, 113 A; 123/41.12

[56] References Cited

U.S. PATENT DOCUMENTS

| | | | |
|---|---|---|---|
| 2,986,250 | 5/1961 | Becker | 192/82 T |
| 3,584,716 | 6/1971 | Coty | 192/58 B |
| 3,993,415 | 11/1976 | Hauser | 192/58 B X |
| 4,134,484 | 1/1979 | Lansinger | 192/58 B |
| 4,181,205 | 1/1980 | Mennucci et al. | 192/58 B |
| 4,678,070 | 7/1987 | Light | 192/58 B |

Primary Examiner—Richard Lorence
Attorney, Agent, or Firm—L. J. Kasper

[57] ABSTRACT

A rotary fluid coupling device is provided of the type including a first rotatable coupling assembly (13) comprising a housing member (15) and a die cast cover member (17). An input coupling member (11) is disposed in a fluid operating chamber (33) and cooperates with an adjacent surface of the cover member (17) to define a viscous shear space therebetween. When the shear space is filled with viscous fluid, torque can be transmitted from the input coupling to the output coupling, such torque transmission resulting in the generation of a substantial amount of heat adjacent the front surface of the cover member. The cover member (17) includes a generally annular portion (36) defining therein a reservoir chamber (35). Disposed within a recessed area defined by the annular portion (36) is a bimetal coil (45) which defines a coil circle C. The annular portion (36) of the cover includes a plurality of blower fin members extending radially inward to a location adjacent the coil circle C, each having an axial height H1 which is a major portion of an axial distance X from the forward surface of the cover member to the bimetal coil. The blower fins (71) generate a radially outward flow of air, thus resulting in an axial flow of air through the bimetal coil, to improve the temperature responsiveness of the coupling device.

12 Claims, 3 Drawing Sheets

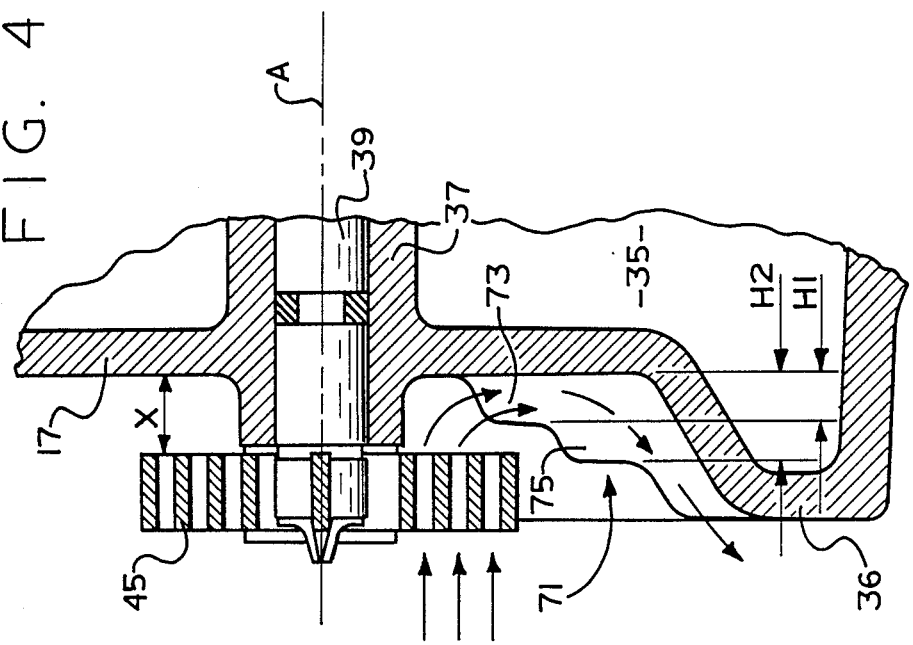
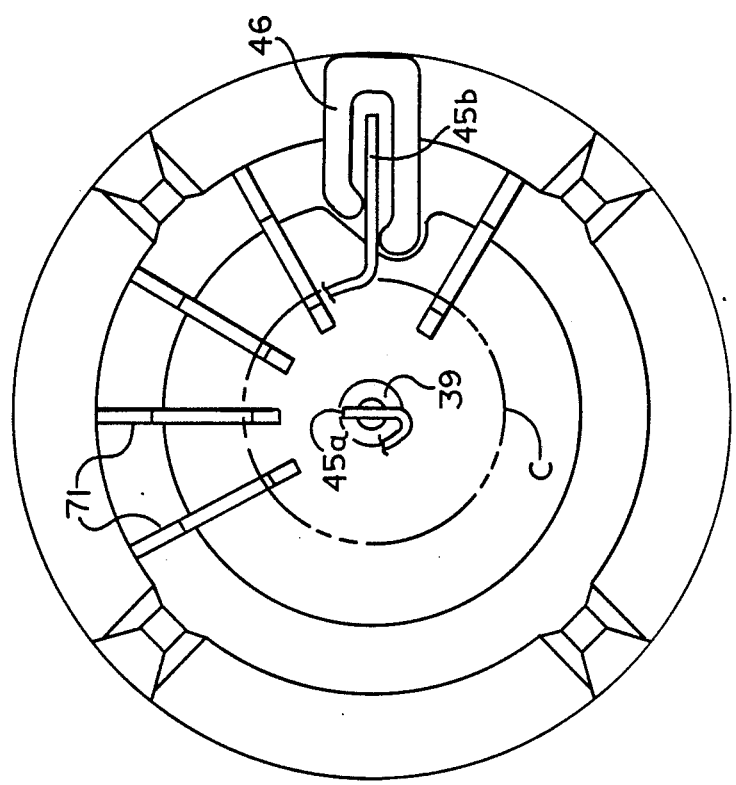

FLUID COUPLING DEVICE HAVING IMPROVED TEMPERATURE RESPONSIVENESS

BACKGROUND OF THE DISCLOSURE

The present invention relates to rotary fluid coupling devices, and more particularly to such devices wherein heat is generated as a result of the torque transmission, and the ability of the coupling device to respond to changes in temperature is an important performance criterion.

Rotary fluid coupling devices of the type which may benefit from the use of the present invention have found many uses, one of the most common of which is to drive the cooling fan associated with the radiator of a vehicle engine. Such coupling devices are frequently referred to as "viscous fan drives" because such couplings utilize a high-viscosity fluid to transmit torque, by means of viscous shear drag, from an input coupling member (clutch) to an output coupling member (housing), to which is bolted the cooling fan.

More specifically, the present invention is especially advantageous when used on a relatively high-torque viscous fan drive, i.e., a fan drive which is capable of transmitting to the cooling fan in the range of about 2 horsepower to about 12 horsepower, although it should be understood that the invention is not so limited. Typically, such high-torque or high-horsepower fan drives include an output coupling assembly comprising a cast aluminum housing and a die cast aluminum cover. The input coupling member and the die cast cover normally include a plurality of interdigitated lands and grooves which define the shear space. When this shear space is filled with viscous fluid, torque is transmitted from the input coupling member to the output coupling assembly, in response to rotation of the input coupling member.

During torque transmission, substantial heat is generated as a result of the shearing of the viscous fluid, and the cast cover is the primary heat dissipating element of the device. Therefore, it has been conventional practice in such viscous fan drives to have a plurality of cooling fins cast integrally with the cover. An example of a fan drive to which the present invention may be advantageously applied is shown in U.S. Pat. No. 4,678,070, assigned to the assignee of the present invention and incorporated herein by reference. In such fan drives, the cast cover defines a raised, annular, reservoir-defining portion, and disposed within the recess defined by this annular portion is the bimetal coil which provides temperature responsive operation of the valving within the coupling device.

The air in the recess where the bimetal coil is located is relatively stagnant, because the coil and the recess are located on the axis of rotation of the coupling device, which is also the center line of the natural stream of air flow past the device. Changes in the temperature of the water in the radiator, resulting in changes in the temperature of the air flowing through the radiator, indicate changes in the need for fan drive operation. Heat is transferred from the flowing air to the bimetal coil by forced convection, but with relatively little air flow in the region of the coil, the fan drive may not respond as quickly as desired to changes in coolant temperature. More specifically, when the fan drive has been disengaged, and a situation occurs which demands relatively greater cooling, the temperature of the coolant rises rapidly, as does the temperature of the air being drawn through the radiator. However, the bimetal coil does not heat up as rapidly because of the relatively stagnant air surrounding the coil, and the engine may overheat before the coil has been heated sufficiently to cause the fan drive to engage.

If the temperature responsiveness of a viscous fan drive can be substantially improved, it would then be possible to set the calibration at a higher temperature, i.e., the fan drive would engage at a higher temperature. A higher calibration temperature would mean that the fan clutch would engage less frequently thus reducing the engine horsepower consumed by the fan drive, but perhaps more importantly to the customer, reducing the amount of time (frequency of engagement) that the fan drive spends in the engaged condition. Keeping the fan drive disengaged more of the time reduces the amount of undesirable fan noise.

SUMMARY OF THE INVENTION

Accordingly, it is an object of the present invention to provide an improved rotary fluid coupling device which is capable of generating a sufficient flow of air in the region surrounding the bimetal element to overcome the problem of stagnant air surrounding the bimetal element.

The above and other objects of the present invention are accomplished by the provision of an improved, relatively high-torque fluid coupling device of the type including a first rotatable coupling assembly comprising a housing member and a cover member cooperating to define a fluid chamber therebetween. A valve means is associated with the first coupling assembly and separates the fluid chamber into a fluid operating chamber and a fluid reservoir chamber. A second rotatable coupling member is disposed in the fluid operating chamber and is rotatable relative to the first coupling assembly, a surface of the second coupling member and an adjacent surface of the first coupling assembly cooperating to define a viscous shear space therebetween. The cover member or the housing member includes a plurality of cooling fins disposed generally adjacent the viscous shear space. The valve means further comprises a movable valve actuating member supported by the cover member, and extending outwardly through the cover member. A temperature responsive bimetal element is operatively connected to the cover member and to the valve actuating member. The cover member includes a generally annular portion disposed generally concentric relative to the axis of rotation, the annular portion being configured to define a major portion of the fluid reservoir chamber. The bimetal element is disposed within the annular portion, and defines an outer periphery.

The improved coupling device is characterized by the annular portion including a plurality of blower fin members oriented generally radially relative to the axis of rotation. Each of the blower fin members extends radially inwardly from the annular portion to a location disposed adjacent the bimetal element periphery. Each of the blower fin members has an axial height at its radially inwardmost extent, which comprises a major portion of an axial distance X from the forward surface of the cover member to the bimetal element.

BRIEF DESCRIPTION OF THE DRAWINGS

FIG. 3 is an enlarged, somewhat schematic, fragmentary, front plan view similar to FIG. 2, including the end portions of the bimetal coil.

FIG. 4 is an enlarged, fragmentary view, similar to FIG. 1, illustrating the blower fins made in accordance with the present invention.

DESCRIPTION OF THE PREFERRED EMBODIMENTS

Figure 1:
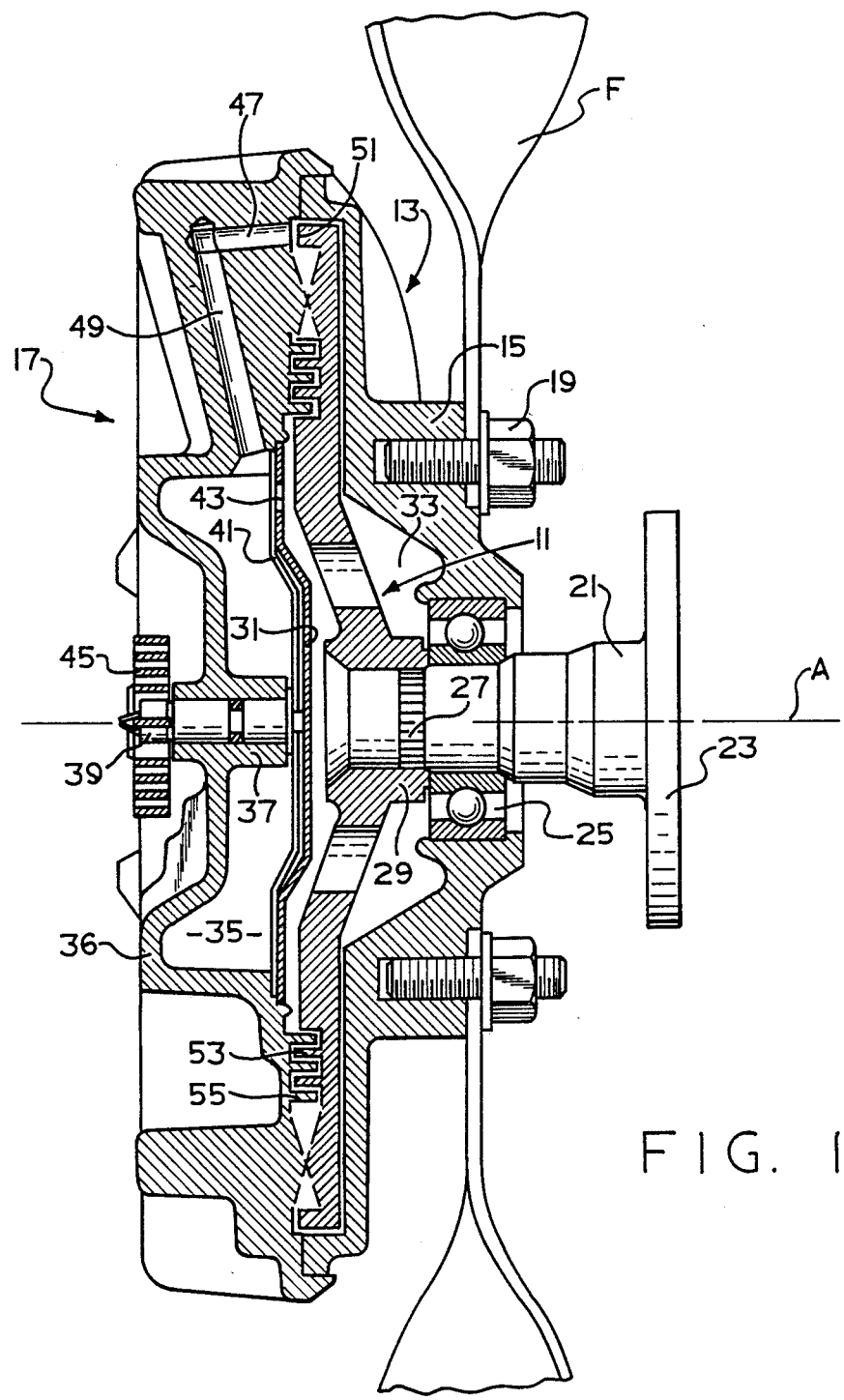
FIG. 1 is an axial cross-section of a typical fluid coupling device of the type with which the present invention may be utilized.

Referring now to the drawings, which are not intended to limit the invention, FIG. 1 illustrates one preferred form of a fluid coupling device (viscous fan drive) of the type with which the present invention may be utilized. The fluid coupling device illustrated in FIG. 1 includes an input coupling member, generally designated 11, and an output coupling assembly, generally designated 13. The output coupling assembly 13 includes a die cast housing member 15 and a die cast cover member 17, the members 15 and 17 being secured together by a rollover of the outer periphery of the cover member 17, as is well known in the art. The fluid coupling device is adapted to be driven by a liquid cooled engine and, in turn, drives a radiator cooling fan F. The fan F may be attached to the housing member 15 by means of a plurality of nuts 19. It will be understood, however, that the use of the present invention is not limited to any particular configuration of fluid coupling device or any particular application thereof, except as specifically noted hereinafter.

The fluid coupling device includes an input shaft 21 on which the input coupling member 11 is mounted. The input shaft 21 is rotatably driven, typically by means of a flange 23 which may be bolted to the mating flange of an engine water pump. The input shaft 21 functions as a support for the inner race of a bearing set 25, which is seated on the inside diameter of the housing member 15. The forward end (left end in FIG. 1) of the input shaft 21 has an interference fit between a serrated portion 27 and an opening defined by a hub portion 29 of the input coupling member 11. As a result, rotation of the input shaft 21 causes rotation of the input coupling member 11.

The housing member 15 and the cover member 17 cooperate to define a fluid chamber which is separated, by means of a circular valve plate 31, into a fluid operating chamber 33 and a fluid reservoir chamber 35. Thus, it may be seen that the input coupling member 11 is disposed within the fluid operating chamber 33.

The cover member 17 defines a raised, annular reservoir-defining portion 36, which is disposed to be generally concentric about an axis of rotation A of the device, and further defines a generally cylindrical shaft support portion 37, and rotatably disposed within the portion 37 is a valve shaft 39 extending outwardly (to the left in FIG. 1) through the cover member 17. Attached to the inner end (right end in FIG. 1) of the valve shaft 39 is a valve arm 41, the general construction of which forms no part of the present invention, but which may be better understood by reference to U.S. Pat. No. 3,055,473, assigned to the assignee of the present invention and incorporated herein by reference. Movement of the valve arm 41 controls the flow of fluid from the reservoir chamber 35 to the operating chamber 33, through a fill opening 43 formed in the valve plate 31.

Operatively associated with the outer end of the valve shaft 39 is a temperature responsive bimetal element, comprising a coil member 45 which, as may best be seen in FIG. 3, includes an inner end portion 45a in engagement with the valve shaft 39, and further includes an outer end portion 45b, received within a cast enclosure member 46. Preferably, the enclosure member 46 is filled with some sort of resilient, elastomeric material which cures in such a manner as to grip resiliently the outer end 45b of the coil. As may also be seen best in FIG. 3, the outer turn of the coil 45 defines a coil circle C, having its center disposed approximately on the axis of rotation A of the coupling device. The significance of the coil circle C will be explained in greater detail subsequently. The manner in which the bimetal coil 45 operates to control the movement of the valve arm 41, in response to variations in a predetermined temperature condition, is well known in the art, is not an essential feature of the present invention and will not be described further.

The cover member 17 defines an axial passage 47 in communication with the fluid operating chamber 33, and a generally radial passage 49 which provides fluid communication from the axial passage 47 to the fluid reservoir chamber 35. Disposed adjacent the axial passage 47 is a pumping element (wiper) 51, operable to engage the relatively rotating fluid in the operating chamber 33 to generate a localized region of relatively higher fluid pressure, and continually pump a small quantity of fluid back into the reservoir chamber 35, through the passages 47 and 49, as is well known in the art.

In the subject embodiment of the invention, the input coupling member 11 includes a forward surface which defines a plurality of annular lands 53. The adjacent surface of the housing member 17 forms a plurality of annular lands 55. The annular lands 53 and 55 are interdigitated to define a serpentine-shaped viscous shear space therebetween, which is shown somewhat schematically in FIG. 1. It is believed that in view of above-incorporated 4,678,070, those skilled in the art can fully understand the construction and operation of the fluid coupling device illustrated in FIG. 1, as well as the various flow paths for the viscous fluid contained therein. As noted in the background portion of the specification, when torque is transmitted from the vehicle engine by means of the input shaft 21 to the input coupling member 11, the result is a shearing of the viscous fluid contained in the shear space between the annular lands 53 and 55.

Figure 2:
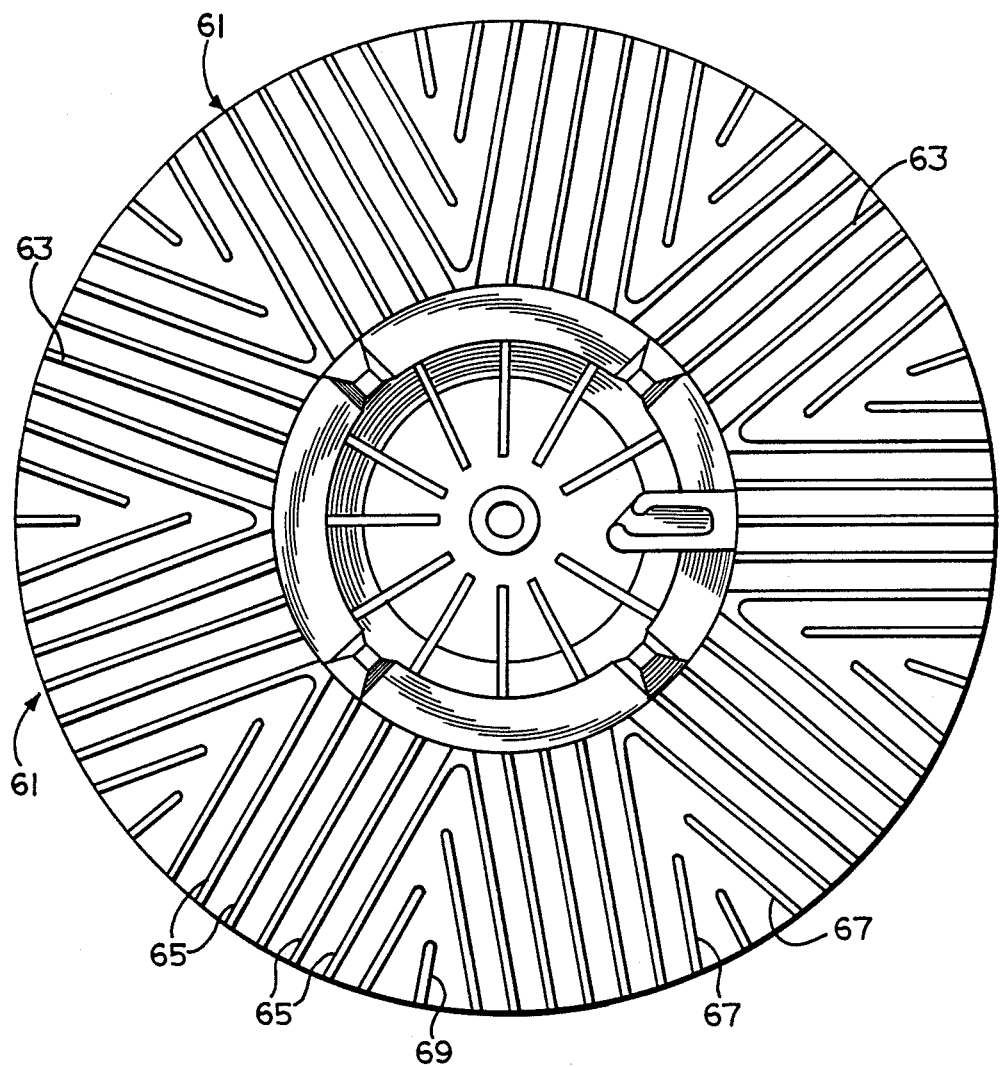
FIG. 2 is a front plan view, of the fluid coupling device of FIG. 1, showing only the cast cover member, with the bimetal coil removed, wherein the cast cover member is made in accordance with the present invention.

Referring now to FIG. 2, it may be seen that the entire finned area of the cover member 17 is divided into a plurality of substantially identical regions 61. Because each of the regions 61 is substantially identical, only one such region 61 will be described hereinafter, it being understood that each of the others is the same. Within each of the regions 61 there is one generally radially-extending cooling fin 63 which, in the subject embodiment, is illustrated as being centrally-disposed within the region 61. On either side of the radially-extending cooling fin 63 is a pair of parallel cooling fins 65. By "parallel" is meant that each of the cooling fins 65 is substantially parallel to the radially-extending cooling fin 63. In addition, each region 61 includes a somewhat shorter cooling fin 67 which is oriented substantially parallel to the adjacent cooling fin 65, and an even shorter cooling fin 69 which is oriented generally radially to its adjacent cooling fin 65. The above-described "parallel" cooling fin arrangement is not an essential feature of the present invention, is described in greater detail in above-incorporated 4,678,070, and therefore will not be described in further detail herein.

Referring now primarily to FIGS. 3 and 4, the present invention will be described in some detail. As was explained in the background of the present specification, it is desirable in temperature responsive coupling devices to maintain a continuous flow of air axially through the bimetal coil 45, to avoid the problem of the coil being surrounded by stagnant air, and therefore, being less responsive to changing temperature conditions.

In the subject embodiment of the present invention, the cast cover member 17 includes a plurality of blower fin members, generally designated 71, only a few of which are shown in FIG. 3, for ease of illustration. Preferably, the fin members 71 are oriented generally radially relative to the axis of rotation A. As may best be seen in FIG. 3, each of the blower fin members 71 extends radially inwardly from the annular reservoir portion 36 to a location disposed adjacent the coil circle C.

Referring now primarily to FIG. 4, each of the fin members 71 includes, in the subject embodiment, a radially inner fin portion 73 and a radially outer fin portion 75. The function of the fin members 71 is to provide a radially outward flow of the air which is disposed between the coil member 45 and the adjacent surface of the cover member 17. Such radial movement of air will, in turn, draw air axially (see arrows) through the coil member 45, and the above-described pattern of air flow has been found to alleviate substantially the problem of the bimetal coil 45 being located in a recess containing stagnant air.

In order to perform the above-described function, it is preferred that the inner portion 73 of each of the blower fin members 71 extend radially inwardly of the coil circle C, but it is believed best to have the inner portion 73 terminate under the coil as shown in FIG. 4, rather than extending radially all the way to the shaft support portion 37. Therefore, references herein, and in the appended claims, to the fin members 71 extending to a location disposed "adjacent" the coil circle C should be clearly understood to mean and include extending to the coil circle C, or terminating somewhat radially outward from the coil circle C, or even extending a substantial distance radially inward of the coil circle C.

As may be seen in FIG. 4, the axial distance from the forward surface of the cover member 17 to the rear surface of the coil member 45 is identified as an axial distance X. The inner fin portion 73 has an axial height H1, and preferably, the height H1 comprises a major portion of the axial distance X.

The outer fin portion 75 has an axial height H2 which preferably is greater than the axial distance X, i.e., the outer fin portion 75 extends above (forwardly of) the underside of the coil member 45. It is believed that the configuration of the blower fin members 71 shown in FIG. 4 will provide an efficient flow of air through the coil and radially outward. However, the present invention is not limited to any particular bimetal configuration, except as set forth in the appended claims.

The invention has been described in great detail sufficient to enable one skilled in the art to make and use the same. It is believed that upon a reading and understanding of the following specification, various alterations and modifications will become apparent to those skilled in the art, and it is intended to include all such alterations and modifications, insofar as they come within the scope of the appended claims.

I claim:

1. A relatively high-torque fluid coupling device of the type including a first rotatable coupling assembly comprising a housing member and a cover member cooperating to define a fluid chamber therebetween; valve means associated with said first coupling assembly and disposed to separate the fluid chamber into a fluid operating chamber and a fluid reservoir chamber; a second rotatable coupling member disposed in said fluid operating chamber and being rotatable relative to said first coupling assembly; a forward surface of said second coupling member and an adjacent surface of said cover member cooperating to define a viscous shear space therebetween; a plurality of cooling fins disposed on said cover member, generally adjacent said viscous shear space and disposed radially outwardly from said fluid reservoir chamber; said valve means further comprising a movable valve shaft rotatably supported by said cover member and a valve element attached to said valve shaft, said valve shaft having an axis of rotation coincident with an axis of rotation of said fluid coupling device and said valve shaft extending outwardly through said cover member; a temperature responsive bimetal element having a first end portion operatively connected to said valve shaft, and a second end portion fixed relative to said cover member; said cover member including a generally annular portion disposed generally concentric relative to said axis of rotation of said device, said annular portion extending axially forwardly from a forward surface of said cover member and being configured to define a major portion of said fluid reservoir chamber; said bimetal element comprising a coil member disposed within said annular portion, said coil member including an outside turn defining a coil circle, said coil member having a rear surface spaced from said forward surface of said cover member by an axial distance; characterized by:
   (a) said annular portion includes a plurality of blower fin members oriented generally radially relative to said axis of rotation, each of said blower fin members extending radially inwardly from said annular portion to a location disposed adjacent said coil circle; and
   (b) each of said blower fin members having an axial height, at its radially inwardmost extent, which comprises a major portion of said axial distance from said forward surface of said cover member to said rear surface of said bimetal coil member.

2. A fluid coupling device as claimed in claim 1 characterized by at least a majority of said blower fin members extending radially inwardly to a location disposed radially inwardly of said coil circle.

3. A fluid coupling device as claimed in claim 1 characterized by each of said blower fin members including a radially inner portion, and a radially outer portion, said radially inner portion having said axial height.

4. A fluid coupling device as claimed in claim 3 characterized by each of said radially outer portions extending radially inwardly to a location disposed radially outwardly of said coil circle, and each of said radially outer portions having an axial height which is greater than said axial distance.

5. A relatively high-torque fluid coupling device of the type including a first rotatable coupling assembly comprising a housing member and a cover member cooperating to define a fluid chamber therebetween; valve means associated with said first coupling assembly and disposed to separate the fluid chamber into a fluid operating chamber and a fluid reservoir chamber; a second rotatable coupling member disposed in said fluid operating chamber and being rotatable relative to said first coupling assembly; a surface of said second coupling member and an adjacent surface of said first rotatable coupling assembly cooperating to define a viscous shear space therebetween, one of said housing member and said cover member including a plurality of cooling fins, generally adjacent said viscous shear space; said valve means further comprising a movable valve shaft rotatably supported by said cover member and a valve element attached to said valve shaft, said valve shaft having an axis of rotation coincident with an axis of rotation of said fluid coupling device and said valve shaft extending outwardly through said cover member; a temperature responsive bimetal element having a first end portion operatively connected to said valve shaft, and a second end portion fixed relative to said cover member; said cover member including a generally annular portion disposed generally concentric relative to said axis of rotation of said device, said annular portion extending axially forwardly from a forward surface of said cover member and being configured to define a major portion of said fluid reservoir chamber; said bimetal element comprising a coil member disposed within said annular portion, said coil member including an outer turn defining a coil circle, said coil member having a rear surface spaced from said forward surface of said cover member by an axial distance; characterized by:

(a) said annular portion includes a plurality of blower fin members oriented generally radially relative to said axis of rotation, each of said blower fin members extending radially inwardly from said annular portion to a location disposed adjacent said coil circle; and (b) each of said blower fin members having an axial height, at its radially inwardmost extent, which comprises a major portion of said axial distance from said forward surface of said cover member to said rear surface of said bimetal coil member.

6. A fluid coupling device as claimed in claim 5 characterized by at least a majority of said blower fin members extending radially inwardly to a location disposed radially inwardly of said coil circle.

7. A fluid coupling device as claimed in claim 5 characterized by each of said blower fin members including a radially inner portion, and a radially outer portion, said radially inner portion having said axial height.

8. A fluid coupling device as claimed in claim 7 characterized by each of said radially outer portions extending radially inwardly to a location disposed radially outwardly of said coil circle, and each of said radially outer portions having an axial height which is greater than said axial distance.

9. A relatively high-torque fluid coupling device of the type including a first rotatable coupling assembly comprising a housing member and a cover member cooperating to define a fluid chamber therebetween; valve means associated with said first coupling assembly and disposed to separate the fluid chamber into a fluid operating chamber and a fluid reservoir chamber; a second rotatable coupling member disposed in said fluid operating chamber and being rotatable relative to said first coupling assembly; a surface of said second coupling member and an adjacent surface of said first rotatable coupling assembly cooperating to define a viscous shear space therebetween, one of said housing member and said cover member including a plurality of cooling fins, generally adjacent said viscous shear space; said valve means further comprising a movable valve actuating member supported by said cover member and a valve element attached to said valve actuating member, said valve actuating member extending outwardly through said cover member; a temperature responsive bimetal element operatively connected to said cover member and to said valve actuating member, said bimetal element defining an outer peripheral and having a rear surface spaced from a forward surface of said cover member by an axial distance; said cover member including a generally annular portion disposed generally concentric relative to an axis of rotation of said device, said annular portion being configured to define a major portion of said fluid reservoir chamber; characterized by:

(a) said annular portion includes a plurality of blower fin members oriented generally radially, each of said blower fin members extending radially inwardly from said annular portion to a location disposed adjacent said bimetal element periphery; and (b) each of said blower fin members having an axial height, at its radially inwardmost extent, which comprises a major portion of said axial distance from the forward surface of said cover member to said rear surface of said element.

10. A fluid coupling device as claimed in claim 9 characterized by at least a majority of said blower fin members extending radially inwardly to a location disposed radially inwardly of said bimetal element periphery.

11. A fluid coupling device as claimed in claim 9 characterized by each of said blower fin members including a radially inner portion, and a radially outer portion, said radially inner portion having said axial height.

12. A fluid coupling device as claimed in claim 11 characterized by each of said radially outer portions extending radially inwardly to a location disposed radially outwardly of said bimetal element periphery, and each of said radially outer portions having an axial height which is greater than said axial distance.

* * * * *